United States Patent [19]

Kimberlin

[11] Patent Number: 5,293,959
[45] Date of Patent: Mar. 15, 1994

[54] LOW PRESSURE SYSTEM LUBRICATION FOR A JACKHAMMER

[75] Inventor: Robert R. Kimberlin, Troutvill, Va.

[73] Assignee: Ingersoll-Rand Company, Woodcliff Lake, N.J.

[21] Appl. No.: 947,622

[22] Filed: Sep. 21, 1992

[51] Int. Cl.$^5$ .............................................. F01M 9/00
[52] U.S. Cl. ..................... 184/6.14; 184/7.4; 184/55.1; 173/71; 173/78; 173/DIG. 3
[58] Field of Search .................. 184/6, 6.14, 6.22, 7.4, 184/55.1, 55.2; 173/71, 74, 78, DIG. 3; 91/321, 328

[56]  References Cited
U.S. PATENT DOCUMENTS

| | | | |
|---|---|---|---|
| 1,248,966 | 12/1917 | Wilhelm | 91/321 |
| 1,574,016 | 2/1926 | Bayles | 173/78 |
| 1,778,937 | 10/1930 | Gartin | 173/74 |
| 1,968,901 | 8/1934 | Nell | 184/55.1 |
| 2,318,063 | 5/1943 | Davey et al. | 173/78 |
| 2,784,701 | 3/1957 | O'Farrell | 173/78 |
| 3,977,496 | 8/1976 | Black | 184/6.14 |

Primary Examiner—Thomas E. Denion
Attorney, Agent, or Firm—John J. Selko

[57]  ABSTRACT

A percussive, fluid-activated jackhammer includes a low pressure lubrication system having a liquid lubrication reservoir chamber formed in a bore of the jackhammer, the lubrication chamber being subject to low percussive fluid pressure in a front piston chamber but not to high percussive fluid pressure in a drive or return chamber of the device. An inlet passageway is provided for adding lubricant to the lubricant chamber. An outlet passageway is provided, with a metering device therein, for flow of lubricant into the bore of the device during reciprocation of a piston in the bore.

9 Claims, 3 Drawing Sheets

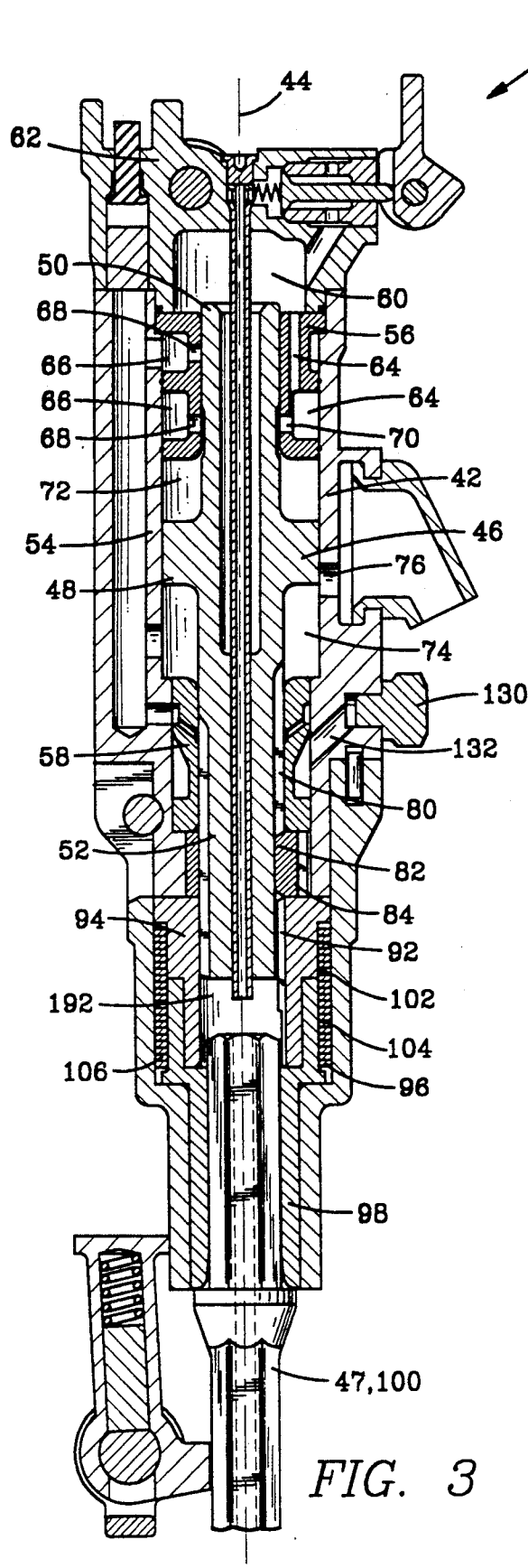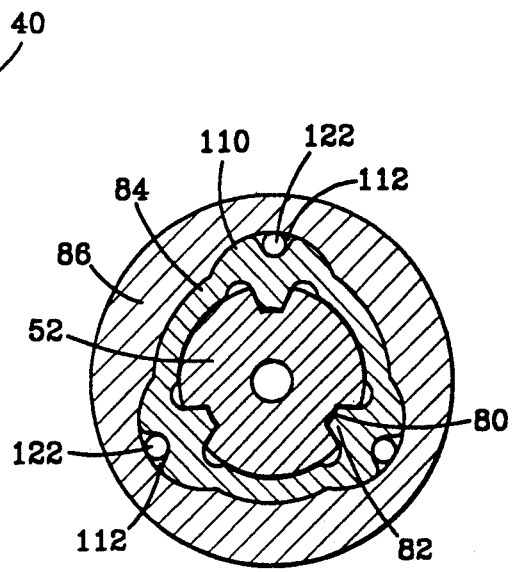
FIG. 5
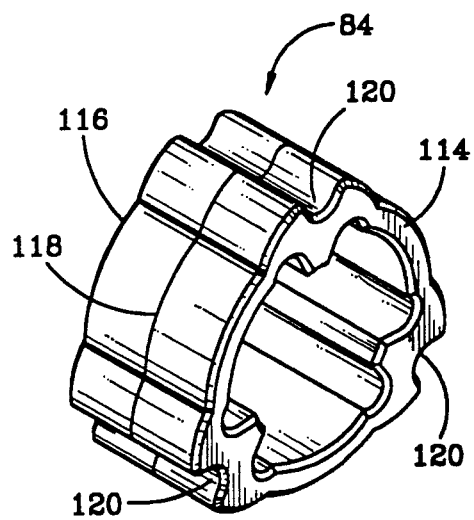
FIG. 6
FIG. 3

LOW PRESSURE SYSTEM LUBRICATION FOR A JACKHAMMER

BACKGROUND OF THE INVENTION

This invention relates generally to a fluid activated percussive impact tool having a piston reciprocal in a housing of such tool, and more particularly to a lubrication system for a jackhammer in which the piston is longitudinally reciprocal and the drill steel is rotated as well as impacted by the piston.

Typical lubrication systems on handheld jackhammers and paving breakers incorporate an oil reserve chamber and some type of metering device. The reserve chamber is generally connected to the high pressure air supply. High pressure air enters the chamber until the chamber reaches the pressure of the supply. Once the supply pressure is relieved, any oil that may be in the chamber will meter back into the high pressure supply line. Once the high pressure chamber is re-pressurized, any oil in the line is then carried into the tool to help lubricate the running components. The metering device to prevent large quantities of oil from escaping the oil reserve can be a complex metering device or a simple sintered, porous filter element. Even with the oil being metered, the oil volume entering the tool is often more that the tool requires for proper operation.

The foregoing illustrates limitations known to exist in present jackhammers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a low pressure lubricating system having a lubricant chamber for storing a liquid lubricant in a bore of a jackhammer, means for introducing a liquid lubricant into the lubricant chamber, means for subjecting the lubricant chamber to low fluid pressure in a front piston chamber, and passageway means between the lubricant chamber and the bore, for introducing lubricant into the bore during operation of the jackhammer.

The foregoing and other aspects will become apparent from the following detailed description of the invention when considered in conjunction with the accompanying drawing figures.

BRIEF DESCRIPTION OF THE DRAWING FIGURES

FIG. 3 is a cross sectional view of the jackhammer of this invention;

FIG. 5 is view along lines B—B of FIG. 4;

FIG. 6 is an isometric view of a removable splined nut for use in this invention;

DETAILED DESCRIPTION

While this invention has been illustrated and described in accordance with a preferred embodiment, it is recognized that other variations and changes may be made therein without departing from the invention as set forth in the claims.

Figure 1:
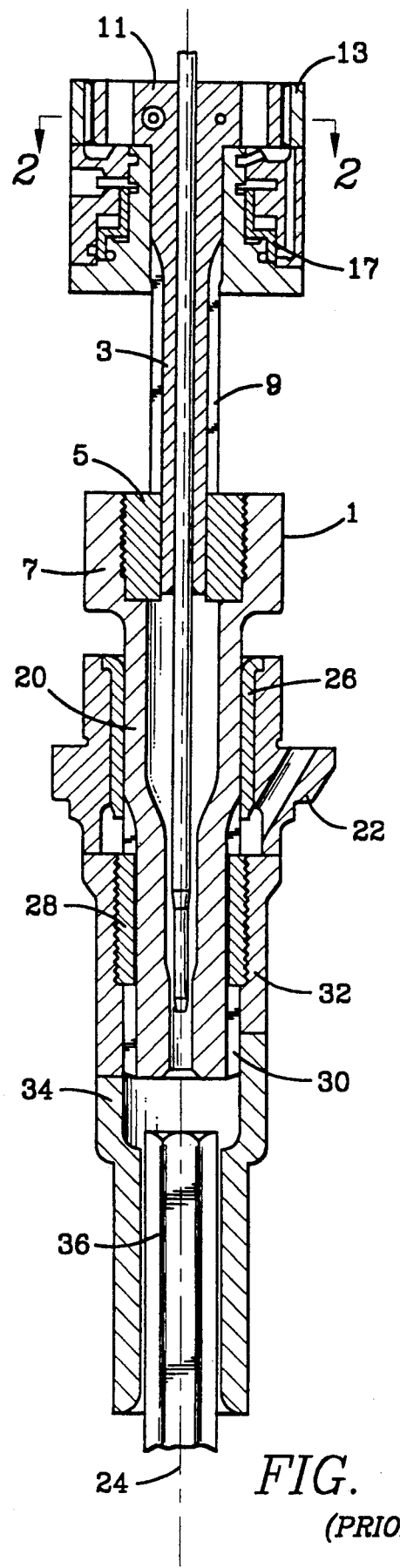
FIG. 1 is cross sectional view, with parts removed, of a prior art piston rotated by a ratchet and pawl mechanism.
Figure 2:
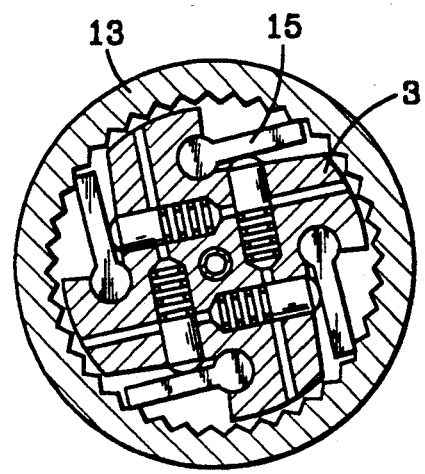
FIG. 2 is a view along lines A—A of FIG. 1.

Referring to FIGS. 1 and 2, the prior art jackhammer having a mechanism for rotating the piston during the stroke cycle is shown. Piston 1 is mounted on rifle bar 3 by means of piston rifle nut 5 that is threadably connected to piston head 7. Piston rifle nut 5 is slidably mounted on rifle bar 3 by means of internal splines that match longitudinal grooves 9 that extend along rifle bar 3 in the same longitudinal direction as the reciprocation of piston 1.

Top end 11 of rifle bar 3 is connected to a ring gear 13 by means of a plurality of pawls 15 that interact with ring gear 13 to permit rotation in only one direction. Ring gear 13 is positioned in the backhead portion of the jackhammer housing (not shown) along with valve 17 that distributes percussive fluid to the drill during the operation thereof.

Piston stem 20 is supported in housing 22 for reciprocation along longitudinal axis 24 by piston stem bearing 26. Chuck nut 28 is slidably mounted on piston stem 20 by means of internal splines that match longitudinal grooves 30 that extend along piston stem 20. Chuck nut 28 is threaded into chuck driver 32, that is, in turn, connected to chuck 34. Drill steel 36 is slidably mounted into chuck 34. Thus, it can be understood, that in the prior art jackhammers, the piston 1 reciprocates back and forth in a longitudinal direction, while at the same time, it rotates in one direction. This rotational movement is translated to drill steel 36 by means of the connection between piston 1 and piston rifle nut 5, and splined chuck nut 28 that is, in turn, connected to chuck driver 32, and chuck 34.

Referring to FIG. 3, the jackhammer of the invention is shown generally as 40 having an outer housing 42 through which extends a central bore having a longitudinal axis 44 for reciprocation of a piston 46 and a drill steel 48, 100, as is conventional. Piston 46 is actuated by a percussive fluid, such as compressed air at a pressure of about 90 to 100 psig. Piston 46 comprises a piston head 48, a piston tail 50 on one side of piston head 48, and a piston stem 52 on an opposite side of piston head 48. Piston 46 is supported for longitudinal reciprocation in housing 42 by housing body member 54 contacting piston head 48, air distributor 56 contacting piston tail 50 and piston stem bearing 58 contacting piston stem 52, as is well known.

Percussive fluid is introduced into accumulator chamber 60 in backhead 62, and is directed by distributor 56 to fluid passageways 64, 66 and ports 68, 70 to a drive chamber 72 and thereafter to a return chamber 74. Depending upon the position of piston 46 in the stroke cycle, either drive chamber 72 or return chamber 74 is opened to exhaust port 76, to exhaust the fluid in the respective chamber, 72 or 74.

The piston 46 is grounded from rotary motion through a series of longitudinal grooves 80 that extend downwardly along piston stem 52. As used herein, the terms "longitudinal" or "longitudinally" mean in a direction that is parallel to axis 44. Grooves 80 mate to splines 82 in a removable splined nut 84 that is non-rotatable, with respect to its surrounding housing 86 (FIG. 5). Splines 82 are formed in an inner surface of nut 84 and extend longitudinally downwardly along the length of nut 84.

Figure 8:
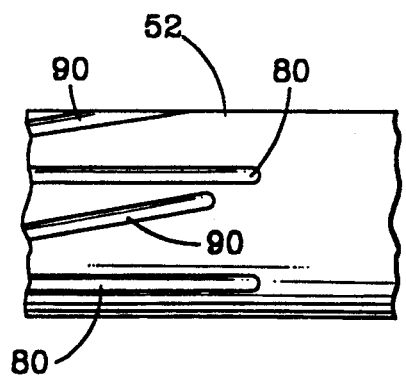
FIG. 8 is perspective view of a piston stem showing the longitudinal and helical grooves.

The piston 46 also has a series of helical grooves 90 (FIG. 8) which are connected to helical splines 92 in a helical nut 94. Helical grooves 90 extend downwardly along piston stem 52 and are located between a said longitudinal grooves 80, preferably one helical groove 90 between each pair of adjacent longitudinal grooves 80. The helical action of the splines 82 causes the helical nut 94 to oscillate rotatably back and forth as the piston 46 reciprocates. The helical nut 94 is then frictionally attached to a uni-directional clutch mechanism, such as a wrap spring clutch 96, which drives the chuck 98 and drill steel 100. Helical nut 94 is provided with an external surface that has a first hub surface 102 thereon. Chuck 98 is positioned in the bore so that a second external hub surface 104 on chuck 98 is provided adjacent to first hub surface 102. A helical spring 106 is wrapped around both first and second hub surfaces 102, 104, so that as piston 46 reciprocates, the chuck 98 and drill steel 48, 100 therein, rotate in one direction. The wrap spring clutch mechanism is described in U.S. Pat. No. 5,139,093, issued to Leland H. Lyon et al.

Splined nut 84 is removable from housing 86. Removability is provided by eliminating the prior art threaded connection between nut 5 and piston head 7, that is shown in FIG. 1, and providing the nut 84 with internal splines 82 that engage with mating grooves 80 in piston stem 52, as shown in FIG. 3. Thus, it can be understood that nut 84 is slidably splined on piston stem 52, but is non-rotatable with respect to the longitudinal axis 44, piston 46 and housing 86.

As shown in FIG. 5, the nut 84 has at least one lobe 110 on the outside profile of the nut itself. While I prefer three lobes 110, equally spaced around a circumference of an outer surface of nut 84, any reasonable number will work. Each lobe 110 of this male profile of the nut 84 engages a female type lobe cavity 112 in the surrounding housing 86. The piston 46 reciprocates as the drill operates. The wrap spring clutch 96 influences the piston 46 to rotate. The function of the nut 84 is to prevent this rotation. As the piston 46 tries to rotate, the splines 82 of the nut 84 resist the rotation. The torsional load is then transmitted to the lobes 110 and lobe cavities 112 of housing 86, thus preventing rotation.

Figure 7:
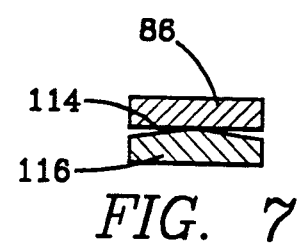
FIG. 7 is an expanded view in circle A of FIG. 4.

As shown in FIGS. 6 and 7, tapering of the outside diameters of the nut 84 further assists in the ability of the nut 84 to carry the load. The nut 84 is tapered such that, when viewed in a cross sectional view, the entire male profile is smaller at the top end 114 and bottom end 116 of nut 84 than at the center portion apex 118 between the top and bottom ends 114, 116, respectively, of the nut. As the nut 84 is inserted into the female housing profile, the nut 84 pinches the housing 86. Thus, it can be understood that there are provided two interference fits: the first one by the lobes 110 and a second one by the tapered body of the nut.

In addition, a third interference fit can be provided by forming in one or more lobes 110 a longitudinal groove 120 extending axially lengthwise along the length of nut body 84. I prefer to provide a groove 120 in each of the three lobes 110. A pin 122 is mildly pressed into each groove 120 for a force fit between the nut 84 and the lobe cavity 112 of housing 86. As the other two interfaces wear away, the pin arrangement will act similar to a roller ramp type clutch which would further pinch the geometry as the nut begins to rotate.

Figure 4:
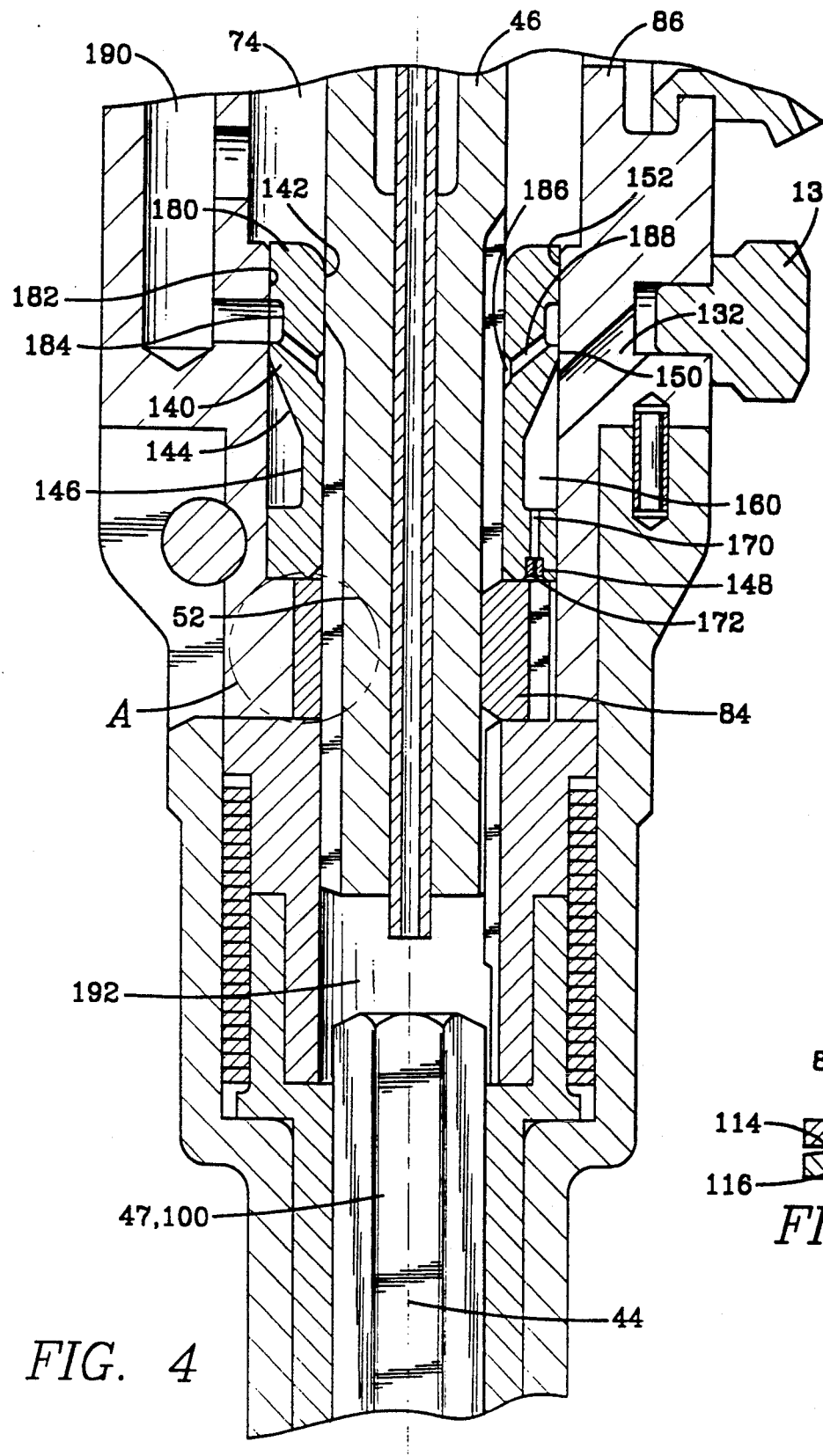
FIG. 4 is an expanded view of the removable clutched spline nut and oil lubrication system of this invention.

Lubrication for the jackhammer is provided by introducing a liquid lubricant, preferably oil, into the percussive air. Oil cap 130 threadably closes an oil inlet tube 132 in housing 86, as shown in FIGS. 3 and 4. The operator of the jackhammer introduces oil into inlet 132 at periodic intervals. Piston stem bearing 140 has an internal surface 142 that slidably contacts piston stem 52, and supports piston 46 for reciprocation along axis 44. Piston stem bearing 140 has an external surface 144 that forms an annular recessed portion 146 and a bottom flanged portion 148. Annular recess portion 146, at an upper land surface 150, contacts housing internal wall 152, in a fluid sealing contact. The combination of external surface 144 and housing 152 form an oil chamber 160. Oil chamber 160 can also be formed, in part or in whole, by a recess in an internal surface of housing 152. Oil chamber 160 communicates with inlet tube 132, to carry oil into chamber 160. An oil feed aperture 170 extends through bottom flange 148 and forms an internal recess for a metering element 172, such as a removable, porous, sintered, metallic plug. Oil feed aperture 170 and metering element 172 provide a passageway for oil to enter into the bore of the jackhammer in the area of the removable splined nut 84. Bottom flange 148 also contacts the internal wall of housing 86 in a fluid sealing contact.

Top end 180 of piston stem bearing 140, in a location that is spaced above upper land surface 150, contacts the internal surface 182 of housing 86 in a second fluid sealing contact. Between top end 180 and upper land 150 is a first circumferential groove 184 in external surface 144 that communicates with a second circumferential groove 186 in internal surface 142 of piston stem bearing 140 by way of a plurality of holes 188 spaced circumferentially around piston stem bearing 140. First groove 184 communicates with an external passageway 190 provided for flushing fluid to pass into front piston chamber 192 and out around drill steel 48,100, by way of holes 188 in bearing 140 and grooves 90 in piston stem 52, for flushing debris from the drillhole. The external passageway 190 and grooves 184, 186, plus holes 188 are optional and form no part of this present invention.

In operation, as the return chamber 74 exhausts, a portion of the exhaust enters the front piston chamber 192 in front of piston 46, by way of longitudinal grooves 80 in piston stem 52. There, such exhaust combines with percussive fluid transmitted down through the center of piston 46 from air distributor chamber 60 in the backhead of the jackhammer. The oil and fluid mixture lubricates the wrap spring clutch 96 and other working surfaces in that area, and eventually is exhausted out around the drill steel, to remove debris from the drillhole.

The pressure in this front chamber 192 is usually 10-30 psig, while the pressure in drive chamber 72 and return chamber 74 is much higher, about 90-100 psig. Because oil chamber 160 is positioned below return chamber 74 and not in fluid contact with the pressure therein, oil chamber 160 is only subject to the lower pressure differential caused by the lower pulsing pressure of front piston chamber 192. This lower pressure differential results in less oil being consumed from oil chamber 160.

Having described the invention, what is claimed is:

1. A low pressure lubrication system for use in a percussive, fluid-activated jackhammer, said jackhammer having a housing forming a central bore, a drive chamber and a return chamber in said bore, to activate a reciprocal piston, and a front piston chamber in said bore between a drill steel chuck and a piston stem end, for exhausting a portion of said percussive fluid out said bore through said drill steel chuck, for debris removal, said low pressure lubrication system comprising:

a. lubricant chamber means in said bore, for storing a liquid lubricant;

b. means for introducing said liquid lubricant into said lubricant chamber means;

c. means for subjecting said lubricant chamber means to fluid pressure in said front piston chamber, including exhaust fluid pressure from said return chamber, but not to fluid pressure in said drive chamber; and d. passageway means connecting said lubricant chamber means and said bore, for introducing said lubricant into said bore during reciprocation of said piston.

2. The system of claim 1 wherein said lubricant chamber means comprises:

a piston stem bearing between said return chamber and said front piston chamber, said piston stem bearing having an internal surface slidingly supporting said piston stem and an external surface in fluid sealing with said housing at an upper and a lower contact surface, said lubricant chamber positioned between said upper and lower contact surfaces, said lubricant chamber being formed, in part, by a recess in said piston stem bearing external surface.

3. The system of claim 2 wherein said passageway means comprises an aperture in said bearing, and includes a metering element in said aperture for metering flow of said lubricant.

4. The system of claim 3 wherein said metering element is a porous metallic plug.

5. A low pressure lubrication system, for use in a fluid-activated jackhammer, said jackhammer having a housing forming a central bore, a reciprocal piston supported therein for reciprocation along a longitudinal axis, fluid passageway means for transmitting a percussive fluid alternately to a drive chamber on a first side of said piston and to a return chamber on a second side of said piston, to activate said piston, said passageway means also forming a front piston chamber between a drill steel chuck and a piston stem end, for exhausting a portion of said percussive fluid out said bore through said drill steel chuck, for debris removal, said low pressure lubrication system comprising:

a. a piston stem bearing between said return chamber and said front piston chamber, said piston stem bearing having an internal surface slidingly supporting said piston stem and an external surface in fluid sealing contact with said housing at an upper and lower contact surface;

b. a liquid lubricant chamber in said bore, formed between said bearing and said housing, said lubricant chamber positioned between said upper and lower contact surfaces;

c. an inlet passageway connected to said lubricant chamber through said housing;

d. a removable closure cap in said inlet passageway;

e. an aperture in said bearing for communicating between said lubricant chamber and said bore; and f. fluid passageway means in said bore, communicating between said lubricant chamber and said front piston chamber, for subjecting said lubricant chamber to fluid pressure in said front piston chamber, including exhaust fluid pressure from said return chamber, when a drill steel is inserted into said chuck, whereby said lubricant is fed into said bore as said piston reciproates.

6. The lubrication system of claim 5 wherein said lubricant chamber is formed, in part, by a recess in said piston stem bearing external surface.

7. The lubrication system of claim 5 wherein said lubricant chamber is formed, in part, by a recess in said housing.

8. The lubrication system of claim 5 wherein said lubricant chamber is formed by a recess in both said piston stem bearing external surface and said housing.

9. In a fluid-activated jackhammer having a housing forming a central bore, a reciprocal piston supported therein for reciprocation along a longitudinal axis, fluid passageway means for transmitting a percussive fluid alternately to a drive chamber on a first side of said piston and to a return chamber on a second side of said piston, to activate said piston, said passageway means also forming a front piston chamber between a drill steel chuck and a piston stem end, for exhausting a portion of said percussive fluid out said bore through said drill steel chuck, for debris removal, the improvement comprising:

a. lubricant chamber means for storing a liquid lubricant;

b. means for introducing a liquid lubricant into said lubricant chamber means;

b. means for subjecting said lubricant chamber means to fluid pressure in said front piston chamber, including exhaust fluid pressure from said return chamber, but not to fluid pressure in said drive chamber; and c. fluid passageway means between said lubricant chamber and said bore, for introducing said lubricant into said front piston chamber during reciprocation of said piston.

* * * * *